United States Patent [19]
Zhang et al.

[11] Patent Number: 5,734,669
[45] Date of Patent: Mar. 31, 1998

[54] 1.3 μM LASERS USING $Nd^{3+}$ DOPED APATITE CRYSTALS

[75] Inventors: Xinxiong Zhang; Pin Hong, both of Orlando; Bruce H. T. Chai, Oviedo; Michael Bass, Orlando, all of Fla.

[73] Assignee: University of Central Florida, Orlando, Fla.

[21] Appl. No.: 749,832

[22] Filed: Nov. 15, 1996

Related U.S. Application Data

[63] Continuation of Ser. No. 383,954, Feb. 6, 1995, abandoned.

[51] Int. Cl.$^6$ .................................................. H01S 3/16
[52] U.S. Cl. .................................................. 372/41; 372/23
[58] Field of Search .................................................. 378/92, 22, 23, 378/41, 39, 42

[56] References Cited

U.S. PATENT DOCUMENTS

| | | | |
|---|---|---|---|
| 3,504,300 | 3/1970 | Mazelsky et al. | 252/301.4 |
| 3,505,239 | 4/1970 | Mazelsky et al. | 252/301.4 |
| 3,549,552 | 12/1970 | Broekhoven | 252/301.4 |
| 3,617,937 | 11/1971 | Mazelsky et al. | 252/301.4 |
| 3,627,692 | 12/1971 | Ohlmann et al. | 252/301.4 |
| 3,869,403 | 3/1975 | Shaw et al. | 252/301.3 R |
| 4,038,204 | 7/1977 | Wachtel | 252/301.4 P |
| 4,075,532 | 2/1978 | Piper et al. | 313/497 |
| 4,266,160 | 5/1981 | Chenot | 313/486 |
| 4,266,161 | 5/1981 | Kasenga et al. | 313/487 |
| 4,731,795 | 3/1988 | Clark et al. | 372/107 |
| 4,765,925 | 8/1988 | Anzai et al. | 252/301.4 F |
| 4,782,491 | 11/1988 | Snitzer | 372/6 |
| 4,884,277 | 11/1989 | Anthon et al. | 372/22 |
| 4,933,947 | 6/1990 | Anthon et al. | 372/34 |
| 4,956,843 | 9/1990 | Akhavan-Leilabady et al. | 373/23 |
| 5,022,041 | 6/1991 | Jacobs | 372/70 |
| 5,022,043 | 6/1991 | Jacobs | 372/95 |
| 5,031,182 | 7/1991 | Anthon et al. | 372/31 |
| 5,130,997 | 7/1992 | Ortiz et al. | 372/22 |
| 5,216,681 | 6/1993 | St. Pierre et al. | 372/22 |
| 5,280,492 | 1/1994 | Krupke et al. | 372/41 |
| 5,309,452 | 5/1994 | Ohishi et al. | 372/6 |
| 5,341,389 | 8/1994 | Payne et al. | 372/41 |
| 5,517,516 | 5/1996 | Marshall et al. | 372/41 |

OTHER PUBLICATIONS

Bethea; "MegawattPower at 1.318 in Nd +3:YAG and Simultaneous Oscillation at Both 1.06 and 1.318 .IEEE Journal of Quantum Electronics.Feb.1973,p. 251.

Zhang et al. Efficient Laser Performance of Nd3+, Sr5(PO4)3F at 1.059& 1.328um, OSA Proceedings, Advanced Solid-State Lasers vol. 20, Feb. 7–10, 1994, pp. 53–55.

Zhang et al., Efficient Laser Performance of Nd3+:Sr5(PO4)3F at 1.059 & 1.328um, Appl. Phys. Lett. 64(24), 13 Jun. 1994, pp. 3205–3207.

*Primary Examiner*—Leon Scott, Jr.
*Attorney, Agent, or Firm*—Brian S. Steinberger; Law Offices of Brian S. Steinberger

[57] ABSTRACT

Laser pumping and flashlamp pumping of apatite crystals such as trivalent neodymium-doped strontium fluorapatite ($Sr_5(PO_4)_3F$) emits efficient lasing at both 1.059 and 1.328 μm. The pump sources for the SFAP material doped with $Nd^{3+}$ includes pulsed Cr:LiSrAlF$_6$ tuned to approximately 805.4 nm. Alternatively, similar results occurred using a continuous wave laser source of Ti:sapphire tuned to approximately 805.4 nm. A preferred embodiment includes a resonant cavity with a high reflectivity mirror having a reflectivity of 100% and an output coupler mirror with a reflectivity of less than 100%. An optional tuning component such as a Pockels Cell-Polarizer combination can also be included. The SFAP material doped with $Nd^{3+}$ exhibits a large absorption cross section, high emission cross section, and long radiative lifetime.

5 Claims, 6 Drawing Sheets

1.3 μM LASERS USING ND³⁺ DOPED APATITE CRYSTALS

This application is a continuation of application Ser. No. 08/383,954, filed Feb. 6, 1995, now abandoned.

This invention relates to apatite crystaline laser materials, and in particular to trivalent neodymium-doped strontium fluorapatite (SFAP) with high efficiency lasing at 1.059 and 1.328 μm.

BACKGROUND AND PRIOR ART

Solid-state lasers based on rare-earth doped crystal have been becoming substantially more significant. These types of systems are increasingly becoming more common in industrial, medical, scientific and military applications. The diverse nature of applications requires the availability of wide ranges of varieties of laser materials that can operate over wide wavelengths. However, most crystal materials are limited to operation over narrow ranges of wavelengths. For example, Nd-doped $Y_3AL_5O_{12}$ (Nd:YAG) is the most common type of laser material, owing to its high emission cross section, relatively long energy storage time, and robust thermomechanical properties. The usual output wavelength for Nd:YAG is approximately 1.064 μm. Other crystal materials have also been doped with Nd and are limited in wavelength operation.

SFAP crystals doped with neodymium, Nd, also referred to as $Sr_5(PO_4)_3F$ and neodymium-doped strontium fluorapatite were successfully grown more than twenty years ago. See U.S. Pat. Nos. 3,504,300; 3,505,239; and 3,617,937 each to Mazelsky et al., which are each incorporated by reference. These references described that SFAP and other apatite crystals such as Calcium Fluorapatite(FAP), $Ca_5(PO_4)_3F$ grown at that time some twenty years ago were limited in lasing at approximately 1.059 μm. U.S. Pat. No. 5,341,389 to Payne et al. issued in August of 1994, which is also incorporated by reference, further described another apatite crystal $Sr_5(VO_4)_3F$ (SVAP) that exhibits lasing at approximately 1.059 μm.

SUMMARY OF THE INVENTION

The first objective of the present invention is to provide SFAP crystal doped with trivalent neodymium, Nd³⁺ that exhibits efficient lasing at approximately 1.3 μm.

The second object of this invention is to provide an SFAP crystal material doped with trivalent neodymium, Nd³⁺ that exhibits efficient lasing approximately at both 1.059 and 1.3 μm.

The invention includes laser and flashlamp for pumping apatite crystals such as trivalent neodymium-doped strontium fluorapatite ($Sr_5(PO_4)_3F$) that lases approximately at both 1059 and 1.3 μm. The laser sources include pulsed $Cr:LiSrAlF_6$ tuned to approximately 805.4 nm. Alternatively, similar results occurred using a continuous wave laser source of Ti:sapphire tuned to approximately 805.4 nm. Alternatively, lasing occurred using a flashlamp pump source. A preferred embodiment includes a resonant cavity with a high reflectivity mirror having a reflectivity of 100% and an output coupler mirror with a reflectivity of less than 100%. An optional timing component such as a Pockels Cell-Polarizer can also be included.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The trivalent neodymium-doped strontium fluorapatite crystal (Nd³⁺ doped SFAP) or Nd³⁺:$Sr_5(PO_4)_3F$ can be synthetically grown utilizing known techniques such as the Czochralski method similar to the one disclosed in U.S. Pat. Nos. 3,504,300; 3,505,239; and 3,617,937 each to Mazelsky et al., which are each incorporated by reference. Here an SFAP sample containing 0.68 at. % Nd³⁺ ($11.4 \times 10^{19}$ Nd³⁺ ions/cm³) was used for laser-pumped laser testing with a peak absorption coefficient of 25.7 cm⁻¹.

Figure 1:
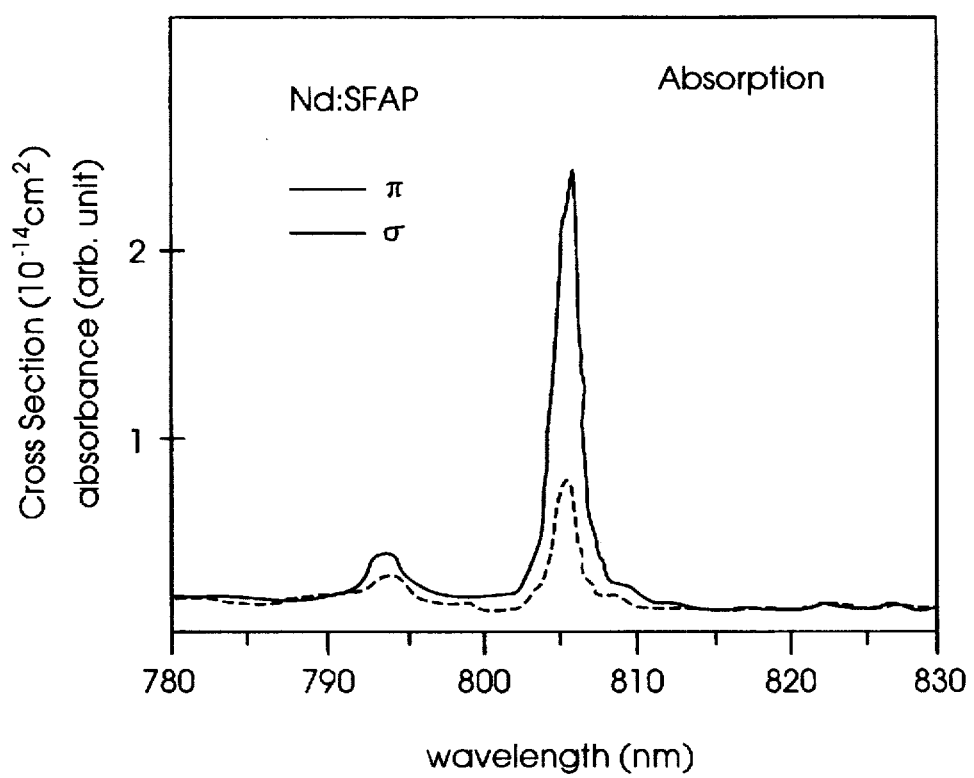
FIG. 1 shows the π and σ room temperature polarized absorption spectra of Nd³⁺:SFAP in the 800 nm region.

Room temperature polarized absorption spectra of Nd³⁺:SFAP in the 800 nm region are given in FIG. 1. The peak absorption coefficient is 2.74 cm⁻¹ for a sample containing 0.2 mole % Nd³⁺ in the melt. Since the distribution coefficient of Nd³⁺ ions in SFAP is 0.36,¹ the actual Nd³⁺ concentration in this crystal is approximately 0.072 at. %. As a result, Nd³⁺:SFAP has an absorption cross section of $2.26 \times 10^{-19}$ cm².

Figure 2:
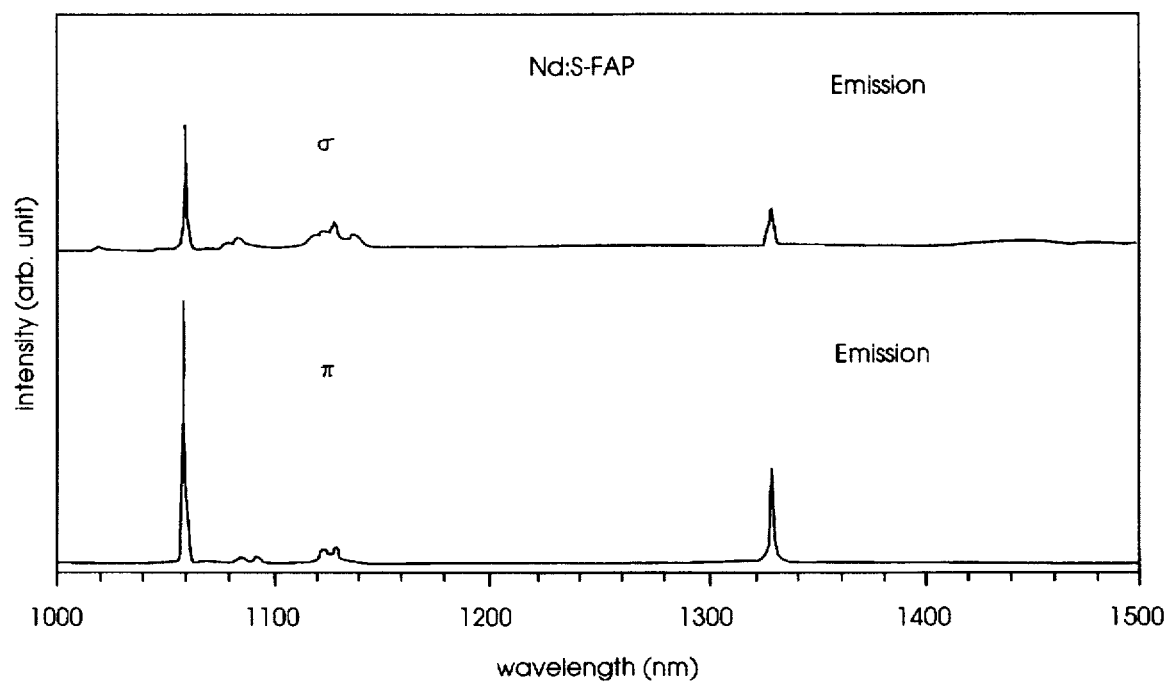
FIG. 2 shows the π and σ room temperature polarized emission spectra of Nd³⁺:SFAP in the 1.06 and 1.3 μm region obtained by continuous wave excitation at 805.4 nm.

Room temperature polarized emission spectra of Nd³⁺:SFAP are shown in FIG. 2. In FIG. 2, the emission is partially polarized with the π polarization stronger than the σ polarization with Room temperature emission decay of 0.072 at. % Nd³⁺:SFAP is exponential with a decay time of 298 μs.

Here an SFAP sample containing 0.68 at. % Nd³⁺ ($11.4 \times 10^{19}$ Nd³⁺ ions/cm³) was used for laser-pumped laser testing with a peak absorption coefficient of 25.7 cm⁻¹. The room temperature emission decay from the $^4F_{3/2}$ manifold is non-exponential in this sample, and, by normalizing the fluorescence intensity at t=0 to one and then integrating the entire decay curve over time, the decay time was found to be only 190 μs. This indicates the existence of concentration quenching in this SFAP crystal. The decay time measurements were done with fine-ground powders of SFAP crystals to avoid the decay time lengthening effect of self-absorption.

For laser experiments, a 1.9 mm-long sample of the 0.68 at. % Nd³⁺:SFAP crystal was cut with flat and parallel faces containing the c-axis. Both pulsed and continuous wave (cw) laser-pumped-laser experiments were performed which simulated diode laser pumping. Pulsed laser action was excited with a long pulse Cr:LiSrAlF$_6$ (Cr:LiSAF) laser. The Cr:LiSrAlF$_6$ laser was tuned to the Nd:SFAP absorption peak at 805.4 nm with a spectral bandwidth of approximately 1 nm. Continuous wave (cw) excitation was achieved with a CW Ti:sapphire(continuous wave titanium saphire) laser tuned to 805.4 nm with a spectral bandwidth of approximately 0.1 nm. More than 95% of the pump power was absorbed in both pump schemes. The laser resonator was composed of a 5 cm radius of curvature high reflectance (HR) mirror coated for the wavelength of interest and a flat output coupler (OC) with a transmission up to 5%. The pump light was focussed with a 10 cm focal length lens through the HR mirror to a point near the side of the laser crystal facing the output coupler (OC).

Nd$^{3+}$:SFAP produced lasing that is linearly polarized along the c axis and occurs at 1.0594 μm for the $^4F_{3/2}$ to $^4I_{11/2}$ transition. Table I lists the thresholds and slope efficiencies for both the pulsed and continuous wave operations comparing Nd:SFAP at 1.0594 μm and Nd:YVO$_4$ at 1.0646 μm. Table I compares these different crystals for output coupler (OC) transmissions of 1.2, 3 and 5%.

TABLE 1

| | threshold | | | | slope efficiency (%) | | | |
|---|---|---|---|---|---|---|---|---|
| | pulsed (μJ) | | cw (mW) | | pulsed | | cw | |
| T (%) | SFAP | YVO$_4$ | SFAP | YVO$_4$ | SFAP | YVO$_4$ | SFAP | YVO$_4$ |
| 1.2 | 5 | 3 | 4 | 4 | 40 | 34 | 42 | 41 |
| 3 | 6 | 4 | 5.5 | 4.6 | 54 | 49 | 54 | 53 |
| 5 | 9 | 6 | 6 | 6 | 60 | 54 | 59 | 59 |

Figure 3A:
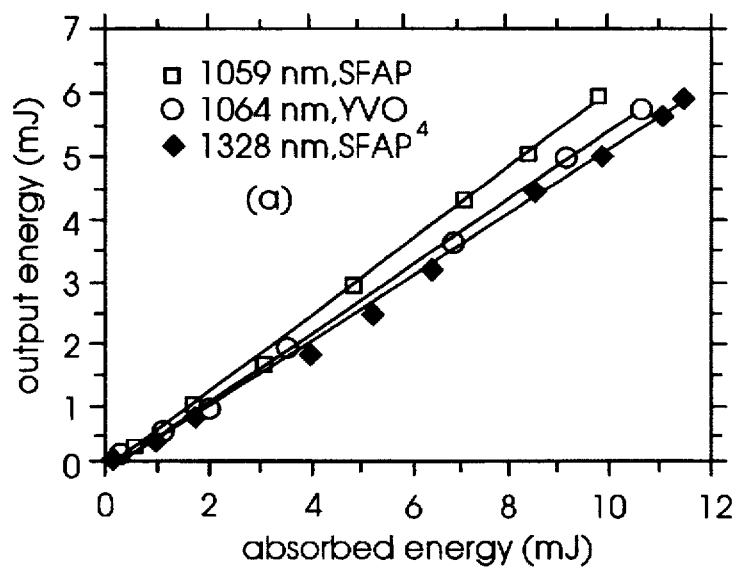
FIG. 3A shows the plot of the laser output energy of Nd³⁺:SFAP and Nd³⁺:YVO₄ for the pulsed operation.
Figure 3B:
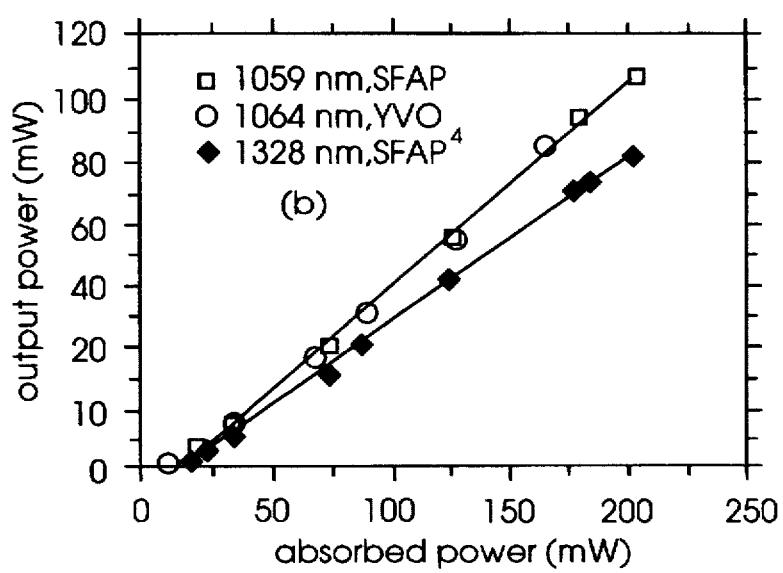
FIG. 3B shows the plot of the laser output power of Nd³⁺:SFAP and Nd³⁺:YVO₄ for continuous wave operation.

FIG. 3A shows the plot of the output energy of Nd$^{3+}$:SFAP and Nd$^{3+}$:YVO$_4$ for the pulsed operation. In FIG. 3A, the laser output energy is plotted as a function of absorbed energy for a 5% Output Coupler (OC). FIG. 3B shows the plot of the output power of Nd$^{3+}$:SFAP and Nd$^{3+}$:YVO$_4$ for continuous wave operation. In FIG. 3B, the laser output power is plotted as a function of absorbed power for a 5% Output Coupler (OC). The measured slope efficiency can be expressed as a function of the transmission of the OC, T, in equation (1) as follows:

$$\eta = \eta_o T/(T+L), \quad (1)$$

where $\eta_o$ is the intrinsic slope efficiency; and L is the double-pass passive loss. In Table I, the parameters $\eta_o=71\%$ and $L=0.93\%$ can be used for pulsed operation, and $\eta_o=64\%$ and $L=0.62\%$ can be used for continuous wave (cw) operation for Nd:SFAP.

The performance of the Nd:SFAP was assessed by comparing Nd:SFAP with a 2.7 mm-long Nd:YVO$_4$ crystal purchased from ITI Electro-Optics Corp. The emission decay time of Nd$^{3+}$ ions in the Nd:YVO$_4$ crystal was measured to be 98 μs, which is about the same as its radiative lifetime indicating negligible concentration quenching. The Nd:YVO$_4$ crystal has a peak absorption coefficient of 17.4 cm$^{-1}$ at 808.7 nm. The Nd$^{3+}$ number density was estimated to be 7×10$^{19}$ ions/cm$^3$ according to the absorption data. The laser output was π-polarized and occurred at 1.0646 μm. However, the laser output power varied from region to region in the crystal indicating inhomogeneities. The results obtained from the best performing region are summarized in Table I for comparison.

The Nd:YVO$_4$ laser input/output characteristics are also given in FIG. 3A and FIG. 3B for a 5% OC. While the Continuous Wave (cw) performances for both crystals are almost identical, the pulsed slope efficiencies for YVO$_4$ are slightly lower than those for SFAP. Analysis of the slope efficiency as a function of the OC transmission for Nd:YVO$_4$ yields $\eta_o=68\%$ and $L=1.18\%$ for pulsed operation, and $\eta_o=64\%$ and $L=0.67\%$ for cw operation.

The stimulated emission cross section of Nd:SFAP has been estimated by the inventors hereof to be 5.4×10$^{-19}$ cm$^2$ at 1.059 μm[5]. As a result, the product of the stimulated emission cross section and the radiative decay time for Nd:SFAP is about 1.5 time that of Nd:YVO$_4$. Concentration quenching exists in the SFAP crystal used in the lasing experiment but was negligible in the tested Nd:YVO$_4$ sample. However, both crystals performed almost identically at 1.06 μm lasers in our experiments. Thus, it is more than probable that SFAP will outperform YVO$_4$ for comparable Nd$^{3+}$ concentrations.

FIG. 2 shows that the relative branching ratio of the $^4F_{3/2}$ to $^4I_{13/2}$ transition at around 1.3 μm to the $^4F_{3/2}$ to $^4I_{11/2}$ transition at around 1.06 μm is quite high. The ratio of the peak intensities at 1.3279 and 1.0594 μm was measured to be 0.37. The similar ratio is only 0.24 in Nd:YVO$_4$ which is known to be a 1.3 μm laser. Lasing at 1.3 μm was tested using the same setup described above except for the coatings. Both mirrors of the resonator in this case have high transmissions (approximately 90%) at around 1.06 μm. The crystal was anti-reflection coated at both 1.06 and 1.33 μm. Lasing was π-polarized and occurred at 1.3279 μm.

Again, FIG. 3A shows the plot of the output energy of Nd$^{3+}$:SFAP for the pulsed operation. In FIG. 3A, the laser output energy is plotted as a function of absorbed energy for a 5% Output Coupler (OC). FIG. 3B shows the plot of the 1.3 μm laser output power of Nd$^{3+}$:SFAP for continuous wave operation. In FIG. 3B, the laser output power is plotted as a function of absorbed power for a 5% Output Coupler (OC). The cw threshold and slope efficiency are 14 mW and 46%, respectively. In pulsed operation the threshold and slope efficiency are 22 μJ and 52%. The quantum limited slope efficiency is approximately 60% for the 1.33 μm transition and thus it is clear that Nd:SFAP performs well as a 1.33 μm laser. By comparing the thresholds at 1.059 and 1.328 μm the effective stimulated emission cross section at 1.328 μm was estimated to be not less than 2.3×10$^{-19}$ cm$^2$.

Figure 4A:
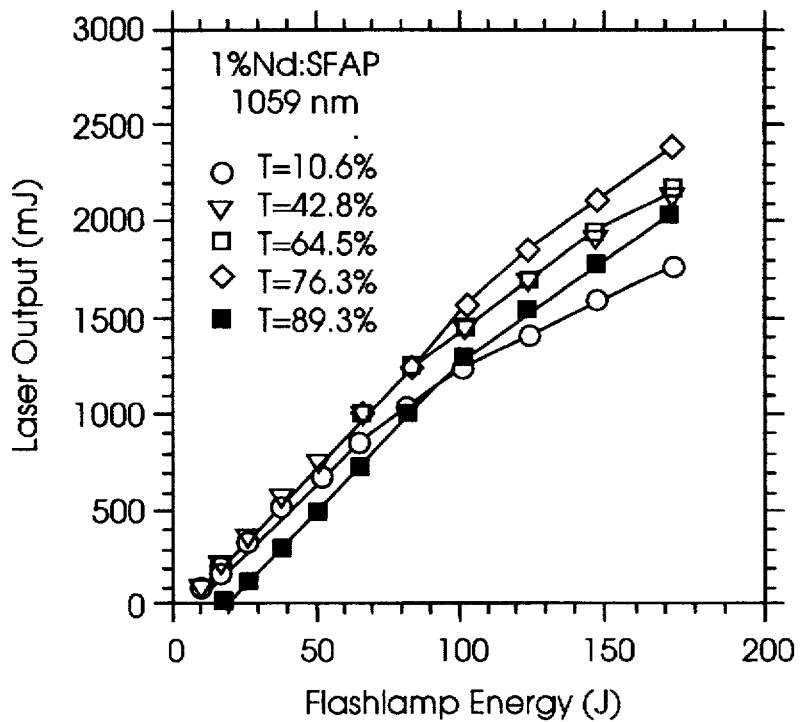
FIG. 4A shows the plot of the laser output energy as a function of the flashlamp energy of Nd³⁺:SFAP at 1059 nm.
Figure 4B:
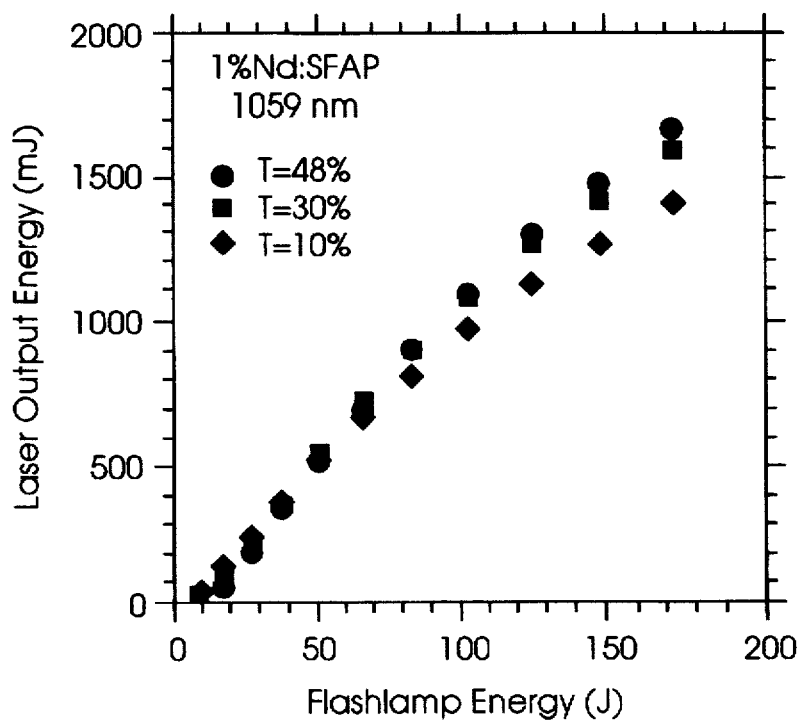
FIG. 4B shows the plot of the laser output energy as a function of the flashlamp energy of Nd³⁺:SFAP at 1328 nm.

FIG. 4A shows the plot of flash/amp output energy of Nd$^{3+}$:SFAP at 1059 nm in flashlamp pumped laser operation. FIG. 4B shows the plot of laser output energy of Nd$^{3+}$:SFAP at 1328 nm in flashlamp pumped laser operation. Referring to FIGS. 4A and 4B, it is apparent that 2.7 J for 1.059 μm and 1.8 J for 1.328 μm have been obtained.

Figure 5A:
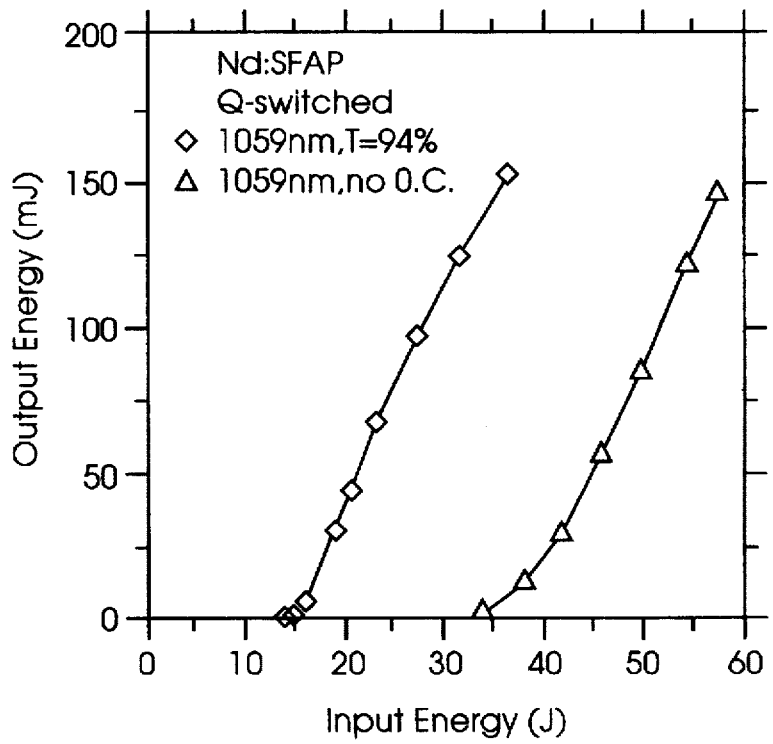
FIG. 5A shows the plot of laser output energy of Nd³⁺:SFAP in Q-switched operation at 1059 nm.
Figure 5B:
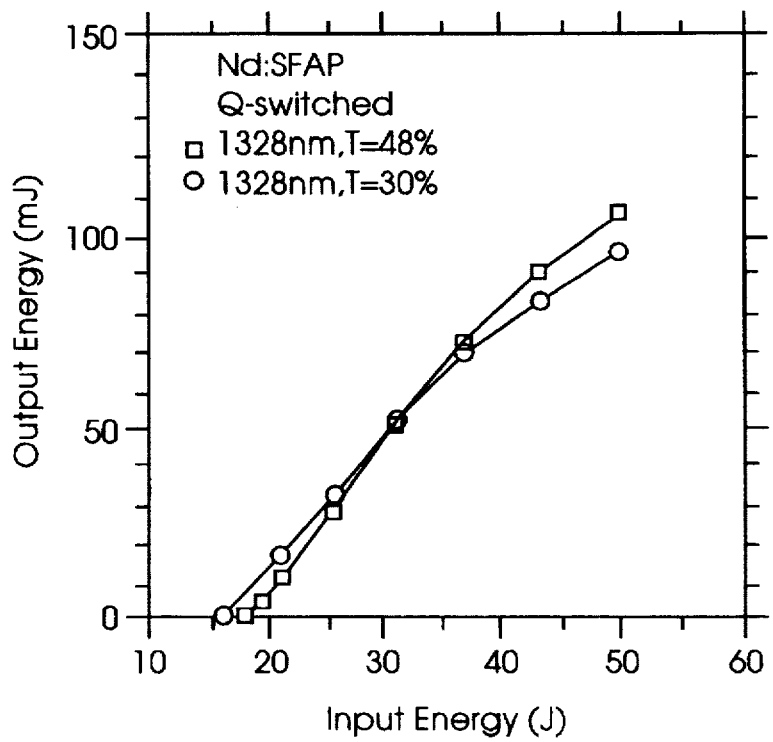
FIG. 5B shows the plot of laser output energy of Nd³⁺:SFAP in Q-switched operation at 1328 nm.

FIG. 5A shows the plot of laser output energy of Nd$^{3+}$:SFAP in Q-switched operation for 1059 nm. FIG. 5B shows the plot of laser output energy of Nd$^{3+}$:SFAP in Q-switched operation for 1328 nm. From FIGS. 5A and 5B, it is apparent that 150 mJ for 1.059 μm and 100 mJ for 1.328 μm have been obtained.

Figure 6:
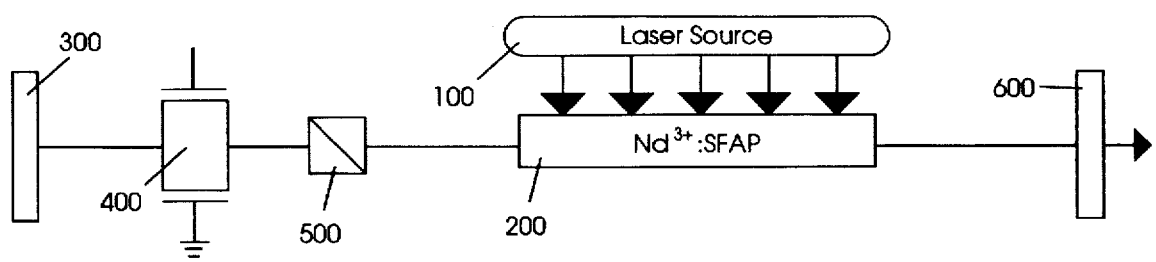
FIG. 6 is a schematic diagram of a Nd³⁺:SFAP laser in Q-switched operation.

FIG. 6 is a schematic diagram of a Nd$^{3+}$:SFAP pump in Q-switched operation. Laser source or flashlamp 100 can be a pulsed or continuous laser pump or flashlamp as described above, for pumping laser medium, 200.SFAP which is positioned within a cavity formed from mirrors 300 and 600. The mirrors need be reflective at 1.3 μm and not be antireflective at 1.06 μm in order to have an output of 1.3 μm. Prior art devices require additional layers and thicknesses of dielectric layers on the mirrors and the like in order to restrict the 1.06 μm emission so that only a 1.3 μm emission occurs. Mirror 300 refers to a high reflection mirror with a reflectivity of approximately 100%. Components 400, 500 are the Q-switch device such as a Pockels Cell-Polarizer combination, mode-locker, etalon, and other known types of shutters. 600 refers to Output Coupler (OC) mirror having a reflectivity of less than 100%. Although, pump source 100 is shown as transverse mounted, source 100 could pump longitudinally through high reflection mirror 300.

Although the preferred embodiments described above refer to specific types of pulsed and continuous wave laser sources, and a flashlamp, other laser sources such as but not limited to diode laser source can be used.

Applications using 1.3 micrometer lasers based on the invention include but are not limited to fiber optic communications and cable television using the fundamental frequency, high power frequency doubled lasers for photodynamic therapy, frequency conversion based on 1.3 µm and dual wavelength lasers.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of simultaneously lasing an apatite crystal at 1.06 and 1.3 µm, comprising the steps of:

(a) emitting optical radiation from a pump source the pump source being tuned to approximately 805.4 nm chosen from one of a pulsed Cr:LiSrAlF$_6$ laser and a continuous wave Ti:Sapphire laser; and (b) pumping a gain medium in a resonator cavity with the optical radiation, the gain medium composed of trivalent neodymium-doped strontium: fluorapatite crystal (SFAP doped with Nd$^{3+}$), the crystal being antireflection coated at both 1.06 and 1.3 µm; and (c) extracting simultaneous peak emissions having wavelengths of approximately 1.06 and approximately 1.3 µm from the resonator cavity.

2. The method of simultaneously lasing an apatite crystal of claim 1, wherein the resonator cavity includes:

a first reflectivity mirror having a reflectivity of approximately 100%;

a Q-switch chosen from at least one of: a pockels cell-polarizer, mode locker, and an etalon, the Q-switch positioned between the first reflectivity mirror and the gain medium; and an output coupler mirror having a reflectivity of less than approximately 100% connected to the gain medium.

3. A laser system for simultaneously outputting peak wavelength emissions of 1.06 and 1.3 µm comprising:

an excitation laser source for generating optical radiation, the laser source being tuned to approximately 805.4 nm chosen from one of a pulsed Cr:LiSrAlF$_6$ laser and a continuous wave Ti:Sapphire laser;

a gain medium in a resonator cavity, the gain medium composed of an apatite crystal chosen from one of: Nd$^{3+}$:Sr$_5$(PO$_4$)$_3$F, Nd$^{3+}$:Ca$_5$(PO$_4$)$_3$F and Nd$^{3+}$:Sr$_5$(VO$_4$)$_3$F, the crystal being antireflection coated at both 1.06 and 1.3 µm, the gain medium being pumped by the generated optical radiation; and means for outputting peak wavelength emissions of approximately 1.06 and 1.3 µm from the resonator cavity.

4. The laser of claim 3, wherein the resonator cavity includes:

a first reflectivity mirror having a reflectivity of approximately 100%;

a Q-switch chosen from at least one of: a pockels cell-polarizer, mode locker, and an etalon, the Q-switch positioned between the first reflectivity mirror and the gain medium; and an output coupler mirror having a reflectivity of less than approximately 100% connected to the gain medium.

5. A laser system for simultaneously outputting peak wavelength emissions of 1.06 and 1.3 µm comprising:

an excitation laser source for generating optical radiation, the laser source being tuned to approximately 805.4 nm chosen from one of a pulsed Cr:LiSrAlF$_6$ laser and a continuous wave Ti:Sapphire laser;

a gain medium in a resonator cavity, the gain medium composed of trivalent neodymium-doped strontium fluorapatite crystal (SFAP doped with Nd$^{3+}$), the crystal being antireflection coated at both 1.06 and 1.3 µm, the gain medium being pumped by the generated optical radiation; and means for outputting peak wavelength emissions of approximately 1.06 and 1.3 µfrom the resonator cavity.

* * * * *